United States Patent [19]

Takeuchi et al.

[11] 4,273,954
[45] Jun. 16, 1981

[54] COORDINATE READING DEVICE

[75] Inventors: Shinziro Takeuchi; Toshiro Kikuchi; Norio Mitsumoto; Toyoki Takahashi; Hidekatsu Hayashi; Satoshi Ichioka, all of Toda, Japan

[73] Assignee: Mishima Kosan Co., Ltd., Fukuoka, Japan

[21] Appl. No.: 963,264

[22] Filed: Nov. 24, 1978

[30] Foreign Application Priority Data

Nov. 25, 1977 [JP] Japan ............................... 52/141356
Apr. 29, 1978 [JP] Japan ............................... 53/51166

[51] Int. Cl.³ ............................................. G08C 21/00
[52] U.S. Cl. ..................................................... 178/19
[58] Field of Search ........................... 178/19; 33/1 M; 340/146.3 YS; 346/139 C

[56] References Cited

U.S. PATENT DOCUMENTS

| 3,806,642 | 4/1974 | Veith et al. | 178/19 |
|---|---|---|---|
| 3,846,580 | 11/1974 | Brenner | 178/19 |
| 3,904,821 | 9/1975 | Whetstone et al. | 178/19 |
| 3,956,588 | 5/1976 | Whetstone et al. | 178/19 |
| 4,018,989 | 4/1977 | Snyder et al. | 178/19 |
| 4,081,603 | 3/1978 | Davis et al. | 178/19 |

*Primary Examiner*—Thomas A. Robinson
*Attorney, Agent, or Firm*—Wenderoth, Lind & Ponack

[57] ABSTRACT

A coordinate reading device including magnetostrictive vibration transmission media to attain coordinate readings of analog figures. A fixed magnetizing coil is wound about or placed on the surface of the media to automatically magnetize the media. A preparatory exciting system excites the exciting coil of the media before an effective excitation pulse is applied to the coil by suitable delay circuits.

10 Claims, 14 Drawing Figures

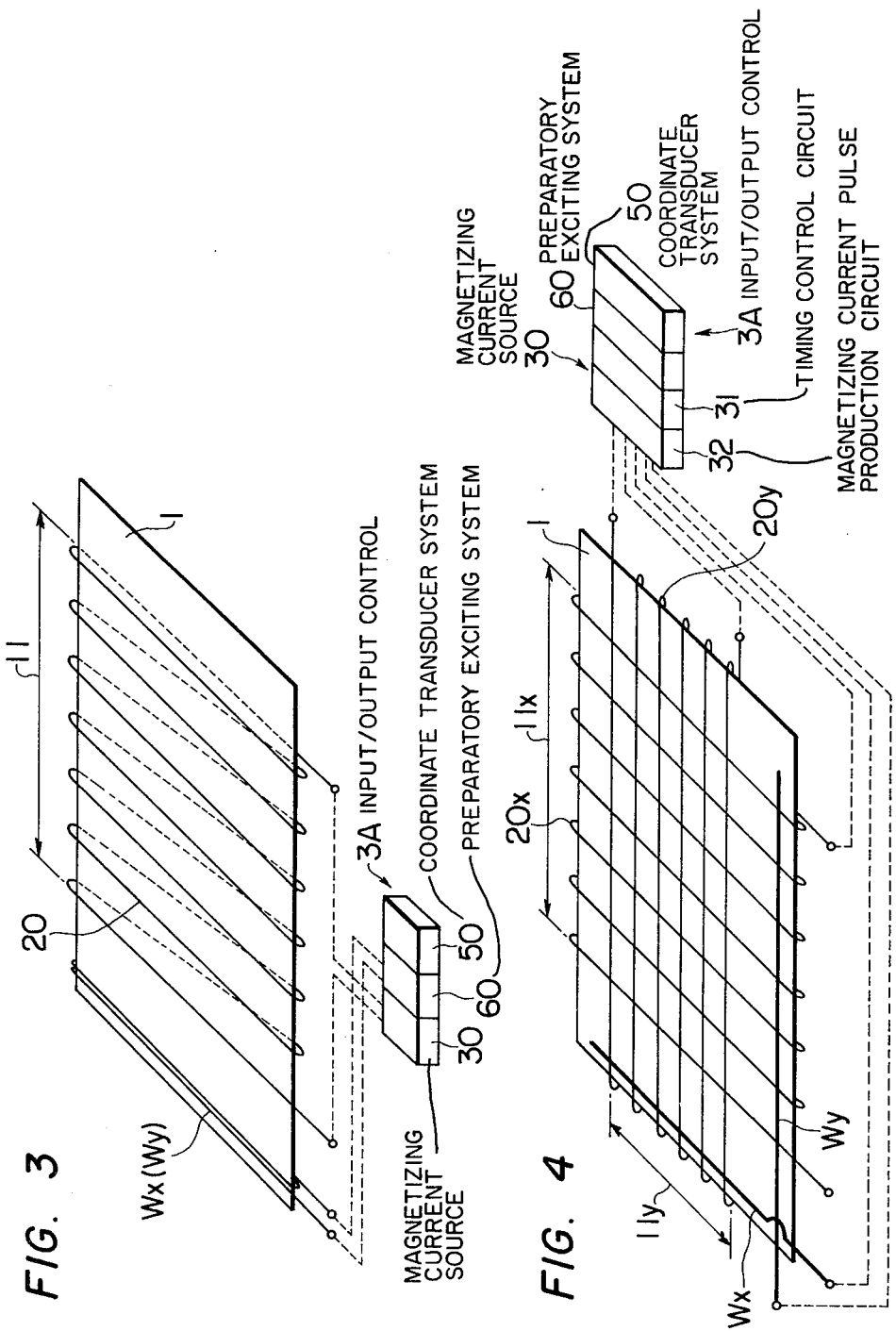

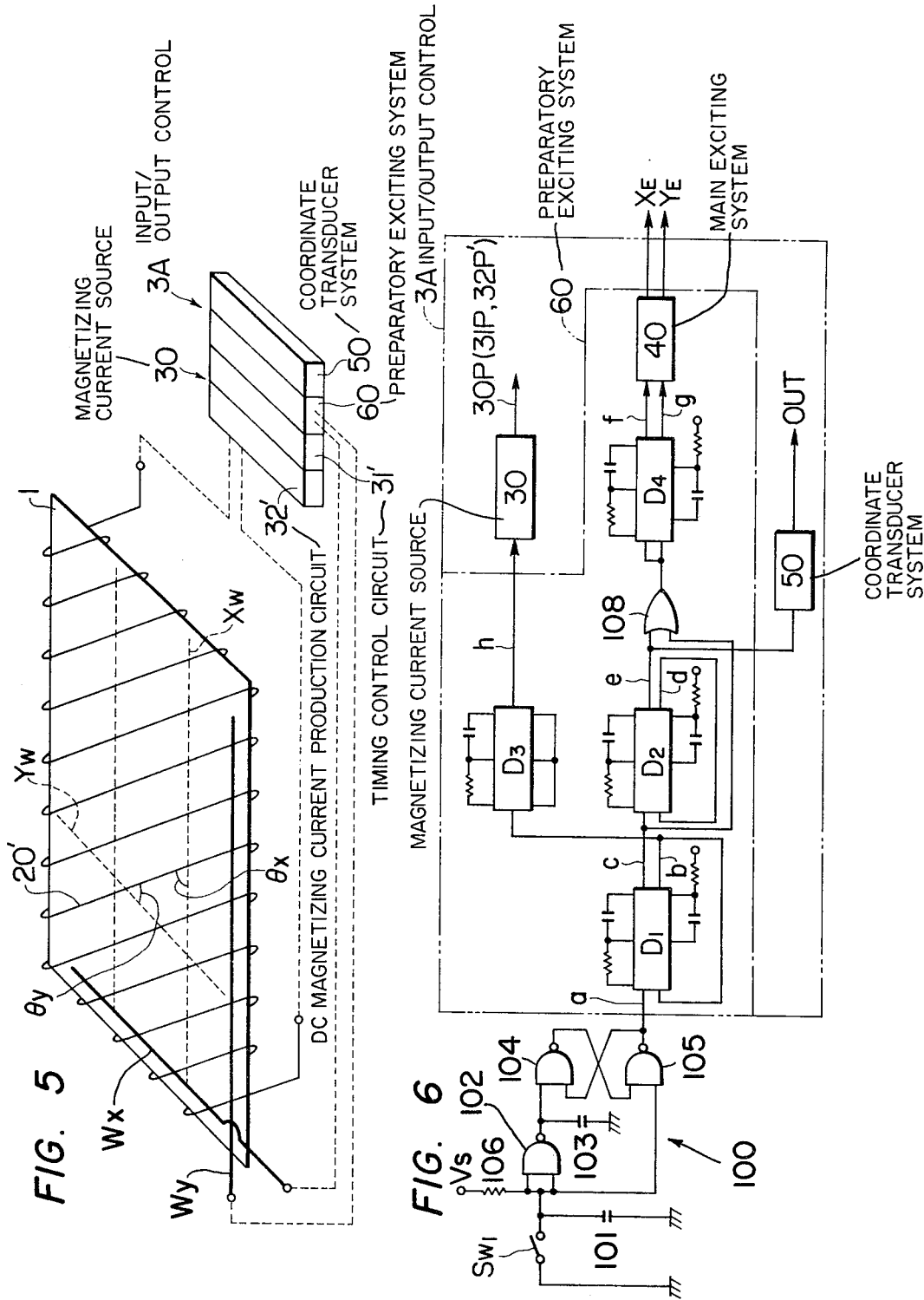

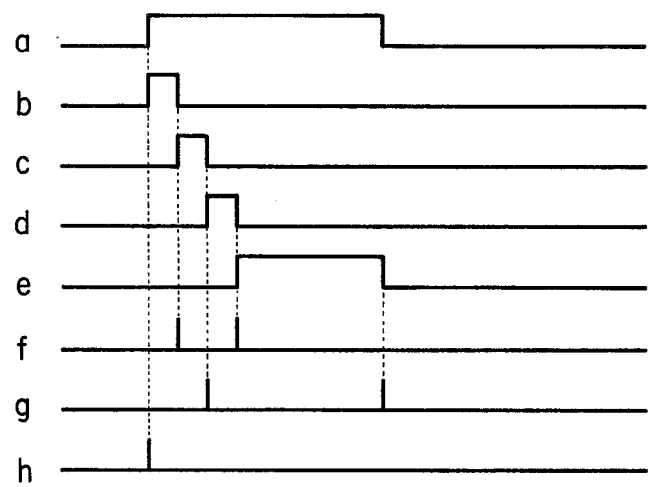
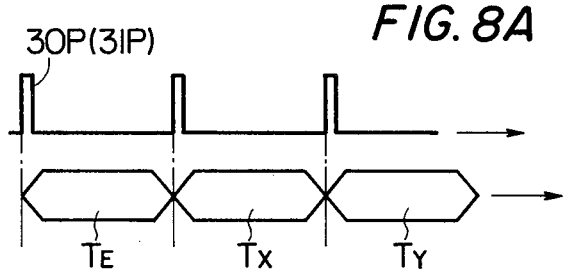
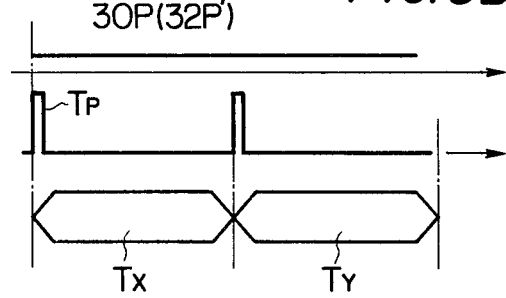

COORDINATE READING DEVICE

BACKGROUND OF THE INVENTION

The present invention relates to coordinate reading devices which utilize magnetostrictive material as vibration transmission media.

Graphical data devices requiring position location are commonly employed in computer data input devices to constitute desired work force saving systems. In such devices, coordinate reading devices utilizing magnetostrictive vibration wave delay in magnetostrictive material, (such as shown in U.S. Pat. Nos. 3,846,580 and 3,904,821), are used widely because such devices are simple to construct and easy to operate.

Thus, a general explanation of a known such coordinate reading system is described below referring to FIG. 1.

The device shown in FIG. 1 consists of a tablet 1, a detector 2 having a pick-up coil and an input/output control 3 which is connected with the tablet 1 and the detector. The control 3 may be connected to an outside device 4 which may be any work force saving system.

To read the coordinates of a desired graphical pattern, (e.g. a circuit network, an electrocardiograph, an X-ray photograph or map), a pen or cursor type detector 2 traces the graphical pattern placed on the tablet 1. The tracing of the pattern forms analog data which is detected as X and Y axis deflections from a zero point, and the deflections are transformed into digital quantities of the input/output control 3 as X and Y coordinate data which is applied to a computer or printer.

As described, the device performs coordinate analysis in a one dimensional plane or in a two dimensional plane which measures X and Y axis deviation, utilizing a magnetostrictive vibration wave delay which is transmitted in a magnetostrictive material. In a two dimensional plane, tablet 1 has two magnetostrictive vibration transmission paths Lx and Ly which are vibrated by excitation coils Wx and Wy respectively to transmit X and Y axis vibration waves.

To form such magnetostriction vibration transmission paths Lx and Ly, rolled thin sheet or electroplated film separated from a base plate of electrostrictive material is cut into rectangles of the desired area. Exciting coils Wx and Wy are arranged at two edges of the rectangle respectively. In this case, no visible lines Lx and Ly are present.

Another method utilizes two such sheets, one for each of the X and Y axes, and forms many slits through the sheets by a photoetching process, to obtain substantial magnetostrictive vibration transmission lines Lx and Ly on each sheet. The sheets are layed together with an insulation sheet therebetween so that the slits are orthogonal to each other and the edges of the sheets are secured by a suitable adhesive material. The desired exciting coils Wx and Wy for the X and Y axis are applied to the sheets respectively. Some other tablets have rolled thin ribbon-shaped sheets, or rolled alloy wires.

In the above mentioned tablet 1, an exciting pulse current is applied to each exciting coil Wx and Wy to vibrate the magnetostrictive material sheet, to produce an excitation magnetic field which excites the sheet to produce a magnetostrictive vibration which is transmitted in the transmission path Lx and Ly to the other ends thereof. A detector 2 approaches a point P to be measured. Magnetic flux changes produced by the electrostrictive vibration which is propagated to the point P induce a voltage in the detector coil. Since the propagation delay time of the vibration wave corresponds to distance along the coordinate axis, the time difference between the detected time at point P and pulse current application time to the excitation coil is measured by counting clock pulses which can be used as coordinate values along an X or Y axis. The delay time is alternately read along X and Y axis. Any desired clock pulse generation and counting system may be used.

FIG. 2 shows the two dimensional tablet 1 as an actual device. Essential parts of the table 1, i.e., the above-mentioned vibration transmission media consisting of a magnetostrictive material must be magnetized to a suitable magnetic potential before reading operation. The magnetizing must be repeated with a predetermined period in relation to the frequency of the reading operation and time delay. Conventionally, a bar magnet 5 moves slowly from one corner diagonally as shown by arrow 6.

The magnetizing operation is performed before a series of reading. However, as the magnetizing function should be applied to the vibration transmission media in the tablet 1 uniformly and in a predetermined accurate direction, much skill is necessary to move the bar magnet so as to prevent the disturbing of an accurate coordinate reading operation. The moving speed of the bar magnet 5 also affects the reading accuracy of the tablet 1. Further, the distance from the surface of the bar magnet 5 to the tablet 1 also affects the reading accuracy. The difficult magnetizing operation must be repeated frequently whenever the exciting condition of the vibration transmission media is damped. As shown in FIG. 2, the effective reading area 11 is arranged within an outside casing 12 of the tablet 1.

When a magnetic disturbance is applied to the magnetostrictive material in the tablet 1, e.g., a disturbance caused by placing a magnet 7 on the tablet 1, the magnetizing effect of the tablet 1 is disturbed greatly, and the reading accuracy and reading function are also disturbed. Thus, after the magnet 7 is removed, the above-mentioned bar magnet magnetizing must be applied. Magnetic disturbance sources such as the magnet 7 are commonly present in stationery and business instruments so that care must be paid to prevent such a magnet from being placed near the tablet 1. When an operator does not know or notice that such a magnetic disturbance has been applied to the tablet 1, the coordinate readings which result are completely unreliable.

SUMMARY OF THE INVENTION

A primary object of the invention is to provide a coordinate reading device which eliminates the manual magnetizing operation.

To attain the above-mentioned object, a coordinate reading device including magnetostrictive vibration transmission media of magnetostrictive material to attain coordinate readings along at least one dimension includes, according to the present invention, at least one fixed magnetizing coil mounted adjacent at least one side surface of said vibration transmission media to regularly magnetize the entire effective coordinate reading region of the media in a substantially uniform fashion, and at least one magnetizing current supply means to apply a magnetizing current to said fixed magnetizing coil.

Thus, the magnetizing operation is easy and uniform, and by magnetizing just before reading, disturbance effects are completely eliminated.

A further object of the present invention is to provide a coordinate reading device which regulates the magnetic spin distribution of magnetostrictive material which forms the vibration transmission media, to eliminate reading errors between first and second readings after a unit effective excitation which is applied just after magnetizing.

To attain the object, a coordinate reading device including magnetostrictive vibration transmission media of magnetostrictive material to attain coordinate readings along at least one direction includes, according to a feature of the present invention, a preparatory exciting system to apply at least one pre-excitation signal to the exciting coil of said vibration transmission media before said coil receives its unit effective excitation.

Thus, magnetic spin distribution in the magnetostrictive material is regulated, i.e., the directional property of the magnetization vector is adjusted to the magnetostrictive vibration before an actual reading, so that the reading error is greatly mitigated and reading accuracy is improved.

The other objects and advantages of the present invention will become apparent from the following detailed description of preferred embodiments with the accompanying drawing.

BRIEF DESCRIPTION OF THE DRAWING

FIG. 3 is a diagrammatic view of a one dimension coordinate reading device according to the present invention;

FIG. 4 is a diagrammatic view of a two dimension coordinate reading device;

FIG. 5 shows another embodiment of a two dimension coordinate reading device;

FIG. 6 is a circuit diagram of a preparatory exciting system, according to the present invention;

FIG. 7 is a pulse timing chart of a preparatory exciting and automatic magnetizing shown in FIG. 6;

FIGS. 8(A) and (B) are timing charts between magnetizing current and exciting output;

DETAILED DESCRIPTION OF PREFERRED EMBODIMENTS

Figure 1:
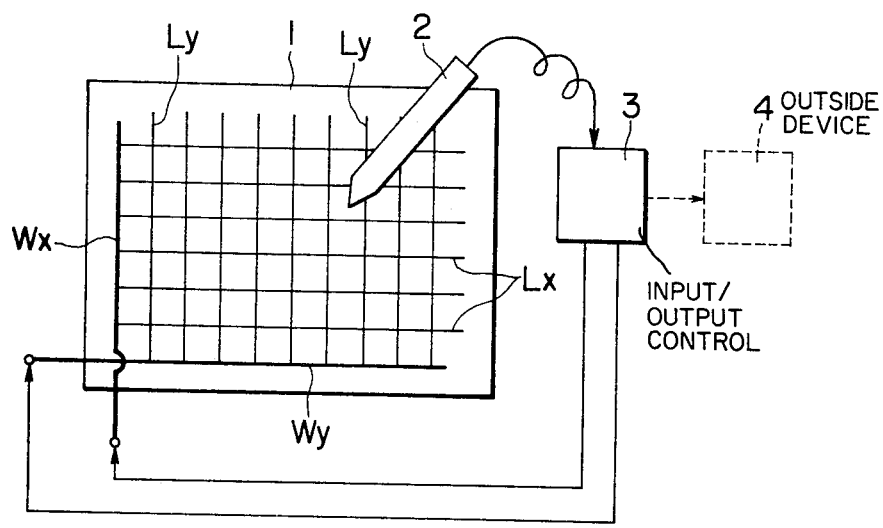
FIG. 1 is an illustration to explain the general operation of a known coordinate reading device.
Figure 2:
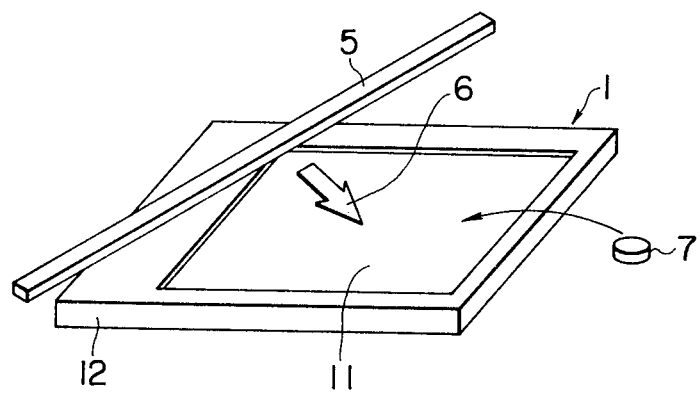
FIG. 2 is an illustration of a conventional magnetizing device.

FIGS. 3-5 show the diagrammatic construction of coordinate reading devices according to the present invention. FIG. 3 shows a one-dimension reading device and FIGS. 4 and 5 show two embodiments of a two dimension reading device. As shown in FIGS. 3-5, fixed magnetizing coils 20, 20x, 20y and 20' are wound about tablet 1, according to the present invention. The magnetizing coils 20, 20x, 20y and 20' are wound about a vibration transmission media 1 formed by a desired magnetostrictive material to accurately magnetize the effective reading region 11 shown in FIG. 3 and regions 11x and 11y shown in FIG. 4 of the vibration transmission media 1. The terminals of the magnetizing coils are connected to a magnetizing current source 30 to effect a substantially uniform regular magnetization. Vibration exciting coils Wx and Wy which are provided to produce x and y axis magnetostrictive vibration waves are also shown.

Input/output control 3A includes the magnetizing current source 30, a preparatory exciting system 60 and a coordinate transducer system 50. In addition, stylus 2 shown in FIG. 1 and not shown in FIGS. 3-5 is also connected with the control 3A. The coordinate transducer system 50 corresponds to a conventional count circuit section of known tablet controllers and includes clock pulse circuits, amplifiers, signal amplifier circuits, various logic circuits, gate circuits, delay circuits reset pulse generating circuits, counters and digital indication and output circuits. The preparatory exciting system 60, according to the present invention includes a plurality of delay circuits, logic circuits and a true exciting section, and will be explained in detail afterwards referring to FIGS. 6 and 7.

In the two dimension tablet shown in FIG. 4, the fixed magnetizing coils 20x and 20y may be energized simultaneously before reading, or may be energized separately in a suitable period corresponding to the reading conditions. The tablet shown in FIG. 5 includes the magnetizing coil 20' which is inclined at angles $\theta x$ and $\theta y$ to the direction of magnetostrictive vibration waves Xw and Yw which are produced by the magnetostrictive vibration exciting coils Wx and Wy respectively. The angles $\theta x$ and $\theta y$ may be equal to each other or may be equal to the angle of diagonal line of effective reading region which may be generally square.

The magnetizing current source 30 applies the desired magnetizing current corresponding to the characteristics of the tablet 1. The current source 30 may include a magnetizing current pulse producing circuit which produces regular magnetizing current pulses, and timing control circuit which initiates the magnetizing current pulse at suitable timing intervals. Alternately, the current source 30 may include a D.C. magnetizing current producing circuit which produces a D.C. magnetizing current and the above mentioned timing circuit.

FIGS. 6 and 7 respectively show a circuit diagram of the two dimension reading device shown in FIGS. 4 and 5 and timing chart of the circuit.

The circuit shown in FIG. 6 includes a stylus switch SW1 which is included in the pen or cursor type detector 2 shown in FIG. 1. The detected signal from the stylus or detector 2 is supplied to the input/output control 3A of the coordinate reading device through a suitable signal processing circuit, e.g.—the conventional chatter prevention circuit 100, shown in FIG. 6. In such a circuit 100, resistor 106 is connected to a DC supply voltage Vs. The voltage at the input to NAND gate 102 is equal to the voltage Vs until the switch SW1 is closed. When switch SW1 is closed, the voltage output of gate 102 becomes a logic "1". However, due to switch bounce or chatter, the voltage at the input to gate 102 does not merely change from Vs to zero volts but instead may traverse the range of voltages a number of times. Capacitors 101 and 103 serve to snub the shorter voltage transients caused by the switch bounce but cannot eliminate them entirely. Therefore, NAND gates 104 and 105, formed into a flip-flop are added to reduce the effects of the switch bounce transients. Such a circuit 100 is conventional and widely used in the industry. The input/output control 3A includes the magnetizing current source 30, the coordinate transducer system 50 and the preparatory exciting system 60 as shown in FIGS. 3-5.

The preparatory exciting system 60 includes a plurality of delay circuits $D_1$–$D_4$, a logic circuit and a main exciting system 40. Each of the delay circuits $D_1$–$D_4$ comprise dual one-shot multivibrator delay circuits and may be constructed from commercially available dual one-shot integrated circuit chips. As shown in the timing circuit of FIG. 7, the output b of one half of delay circuit $D_1$ is a pulse of predetermined pulse-width whose leading edge occurs immediately after the leading edge of pulse a present at the output of gate 105, the generation of pulse b triggered by the leading edge of pulse a. The second half of circuit $D_1$ is triggered by the falling edge of pulse b to produce a pulse c of predetermined width. The leading edge of pulse b triggers circuit $D_3$ to generate pulse h having a narrow pulse-width with respect to pulses a–c. The trailing edge of pulse c triggers one-half of circuit $D_2$ to generate pulse d of a predetermined pulse-width.

The second half of circuit $D_2$ is triggered by the trailing edge of pulse d to generate pulse e of a predetermined pulse-width. Pulses c and e are combined in OR gate 106 to trigger the two halves of circuit $D_4$. One-half of circuit $D_4$ triggered by the leading edges of the pulse output of gate 108 generating pulse f while the second half of circuit $D_4$ is triggered by the trailing edges of the pulse output of gate 108 generating pulses g. The circuit shown in FIG. 6 is constituted from digital integrated circuit networks, however, desired discrete circuit elements may be used.

As shown in FIG. 6, the delay circuit $D_3$ controls the magnetizing timing to form an automatic magnetizing circuit. Thus, the magnetizing current source 30 is triggered by pulse signal h which is produced when the switch Sw1 is turned on.

The delay circuits $D_1$ and $D_2$ product suitably delayed preparatory exciting control pulses b, c, d, and e, which trigger circuit $D_3$, whose output pulses thereof are applied to the main exciting system 40 as pre-excitation trigger pulses f and g, so that the main exciting system 40 is excited once or twice as the switch SW1 is closed but before the actual reading is started.

The main exciting system 40 supplies the desired exciting current to the X and Y exciting coils which are associated with the magnetostrictive vibration transmission media as shown in FIG. 1, and the output thereof are the exciting pulse currents $X_E$ and $Y_E$ as shown in FIG. 6.

Thus, the preparatory exciting system 60 according to the present invention initiates the main exciting system 40 by pulse signals f and g to generate pulse currents to regulate the magnetic vector distribution of the vibration transmission media, before the exciting outputs $X_E$ and $Y_E$ from the main exciting system 40 are supplied for use as the unit effective exciting outputs during the coordinate reading operation. The actual circuitry used in the magnetizing current source 30 and the main exciting system 40 has not been illustrated in the drawings or discussed in detail herewith since such circuitry is conventional and known to those of skill in the art.

Preferably, at least one preparatory excitation current pulse is applied to the X-axis component before main excitation and at least one preparatory excitation current pulse is applied to the Y-axis component. However, the X and Y-axis components may be generated sequentially, or both components may be generated simultaneously. Further, the preparatory excitation current pulses may be applied intermittently, in place of being applied every energization of the switch SW1.

The timing of the preparatory excitation is arranged such that, after the magnetostrictive vibration in the vibration transmission media produced by the preparatory excitation is sufficiently attenuated, the main excitation is applied.

The control pulses b and c may be combined into a single pulse. A circuit to produce such a combined control pulse is well known in the art (e.g.—an OR gate).

The coordinate transducer system 50 produces desired coordinate analysis output from the excitation transmission delay in the magnetostriction vibration transmission media caused by the excitation of the main excitation system 40 and based on the detected signal from the stylus; the output of system 50 generated by processing the signals in the above-mentioned circuit.

FIGS. 8(A) and (B) show relative timing charts between magnetizing function by the magnetizing current source 30 and the reading operation. In the FIGS. 8(A) and 8(B), $T_E$ is the magnetizing period, Tx is the reading period of the coordinate value along the X-axis, and Ty is the reading period of the coordinate value along the Y-axis.

In FIG. 8(A), 30P(31P) is a trigger pulse of the magnetizing current pulse which is controlled by magnetizing output pulse of magnetizing current pulse production circuit 32 outputted to the fixed magnetizing coils 20x and 20y and is applied by the timing control circuit 31 such as shown in FIG. 4.

The timing control circuit 31 also controls the excitation timing of the excitation coils Wx and Wy of the tablet 1. In this case, to the fixed magnetizing coils 20x and 20y, a magnetizing current pulse initiated by the trigger pulse 31P from the timing control circuit may be applied separately, such that the coil 20x is energized just before the X-axis coordinate reading period Tx and the coil 20y is energized just before the Y-axis coordinate reading period Ty.

FIG. 8(B) is a timing chart showing that a DC magnetizing current 30P (32P') is applied to the fixed magnetizing coil 20' shown in FIG. 5. Tx and Ty are reading periods of the X- and Y-axis coordinate values. Tp is the trigger timing of the excitation coils Wx and Wy. In this case, the timing control circuit 31' may initiate the DC magnetizing current production circuit 32' to apply a magnetizing current to the coil 20' during a series of coordinate reading operations such as that shown in FIG. 8(B) or only before the reading operation such as that shown in FIG. 8(A).

The control system based on various timing charts may be selected corresponding to a reading process either of a one-shot mode or a continuous mode, and the selected timing is programmed to attain desired operability of the device corresponding to its operational conditions.

Figure 9A:
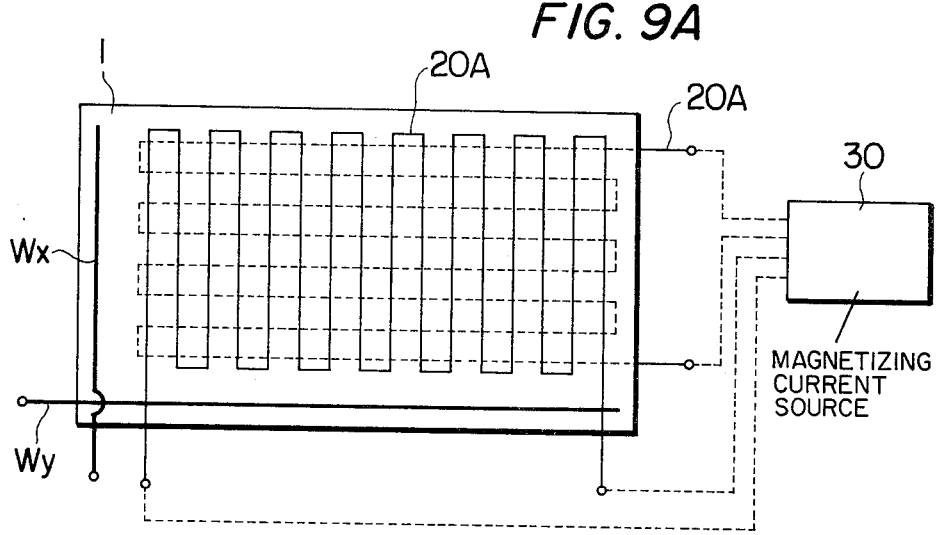
FIGS. 9(A) and (B) show other embodiment of magnetizing coils shown in FIGS. 3-5.
Figure 9B:
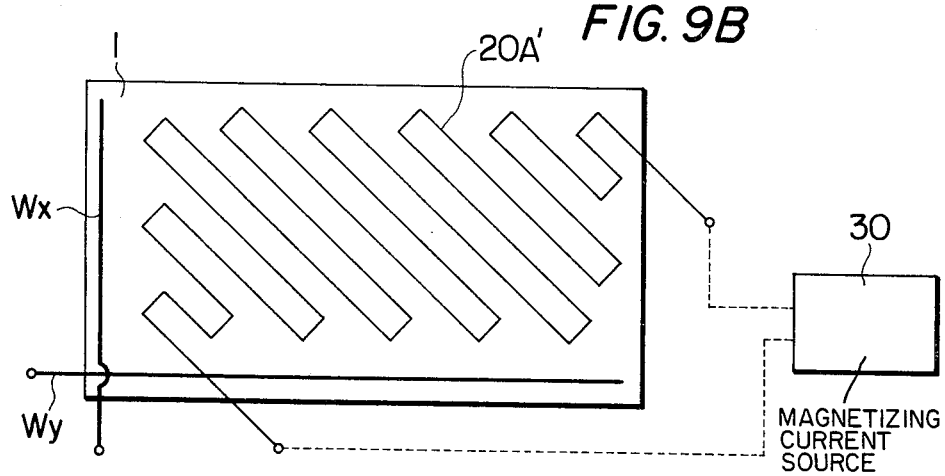
Figure 10A:
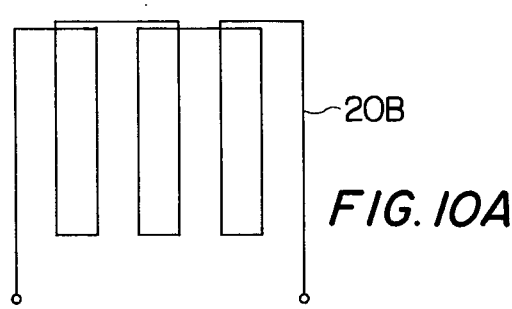
FIGS. 10(A)-(C) show other embodiments of the magnetizing coils shown in FIGS. 9(A) and (B).
Figure 10B:
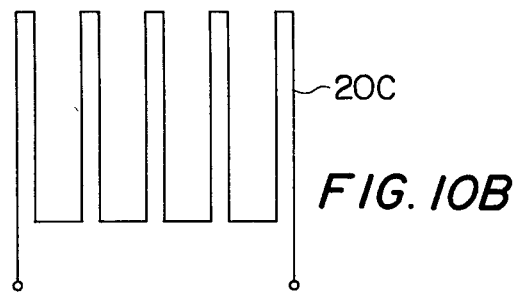
Figure 10C:
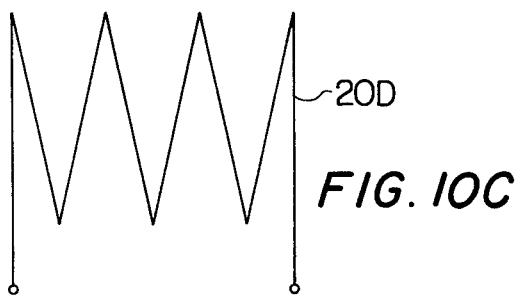

Other embodiments of fixed magnetizing coils, according to the present invention are shown in FIGS. 9 and 10. The magnetizing coils shown in FIGS. 9 and 10 are not wound about the vibration transmission media 1, and are placed on one or both surfaces of the media 1.

As shown in FIG. 9(A), a fixed magnetizing coil 20A is placed on both surfaces of the tablet 1. The magnetizing coils 20A for the X- and Y-axis may be placed on one surface of the tablet 1. Inclined magnetizing coil 20A' corresponding to the wound coil 20' shown in FIG. 5 is placed on one surface of the two dimension tablet 1 as shown in FIG. 9(B). The shapes of the magnetizing coils 20A and 20A' are arranged so as to magnetize the effective reading region of the vibration transmission media 1, to obtain a substantially uniform and regular magnetized condition.

Various shapes of the magnetizing coils are shown in FIGS. 10(A), (B) and (C). A loop shaped coil 20B, a coil 20C having non-uniform spacing, and a wave form coil 20D are shown respectively. These coils may be wound about the tablet 1, or may be placed on one or both sides of the tablet 1.

In the inclined magnetizing coils 20' and 20A' shown in FIGS. 5 and 9(B), angles $\theta x$ and $\theta y$ (shown only in FIG. 5) between the conductor of the magnetizing coil 20' or 20A' and X- and Y-axis direction vibration wave lines Xw and Yw which are transmitted in the tablet 1 can be arranged at any desired angle.

It will be appreciated that the coordinate reading device according to the invention comprises a fixed magnetizing coil means and a magnetizing current source which supplies magnetizing current to the coil means. Thus, the difficult and time consuming magnetizing operation is greatly simplified and magnetizing is easily and automatically performed. As explained the magnetizing operation may be performed just before reading, so that the device can recover from any magnetic disturbance which might be applied to the device. Also, as the magnetizing operation is uniform, reading accuracy is stabilized and improved.

Further, by combining the magnetization control system with the preparatory exciting system 60, according to another feature of the present invention, the coordinate reading process has stability and improved accuracy, and completely compensates for magnetic disturbances.

The preparatory exciting system 60 is initiated by stylus or reading operation pen, i.e., the detector 2 shown in FIG. 1, in the circuit shown in FIG. 6. The preparatory exciting system may be operated with any suitable control pulse generator.

As described in detail, the coordinate reading device having preparatory exciting system 60 completely compensates for any magnetic disturbance effect to the tablet 1 and also regulates the magnetic vector distribution in the magnetostrictive vibration transmission media, so that the measured coordinate analysis value has a high accuracy and high reliability.

Further, the preparatory exciting system 60 includes an automatic magnetizing circuit which has the delay circuit $D_3$ arranged so that, as shown in FIG. 8, the magnetizing operation can be performed automatically and at most preferable timing.

What is claimed is:

1. In a coordinate reading device having a coordinate reading means including magnetostrictive vibration transmission media of a magnetostrictive material to attain coordinate readings along at least one dimension thereof upon the operation of a manual switch, the improvement comprising:
   at least one fixed magnetizing coil mounted adjacent at least one surface of said vibration transmission media to substantially uniformly magnetize an effective coordinate reading region of the media, and
   at least one magnetizing current supply means to apply magnetizing current to said at least one fixed magnetizing coil.

2. A device as claimed in claim 1, wherein said magnetizing current supply means includes a magnetizing current pulse production circuit for producing magnetizing current pulses of predetermined regularity, and a timing control circuit for controlling the magnetizing current pulse circuit in response to the operation of said manual switch.

3. A device as claimed in claim 1, wherein said magnetizing current supply means includes a DC magnetizing current production circuit.

4. A device as claimed in claims 1, 2 or 3, wherein said fixed magnetizing coil is wound about said vibration transmission media.

5. A device as claimed in claims 1, 2 or 3, wherein said fixed magnetizing coil is provided on one surface of said vibration transmission media.

6. In a coordinate reading device having a coordinate reading means including magnetostrictive vibration transmission media of magnetostrictive material to attain coordinate readings along at least one dimension thereof and including an exciting coil for providing a magnetic perturbation to said magnetostrictive media, the improvement comprising:
   a preparatory exciting system to apply at least one pre-excitation current pulse to said exciting coil of said vibration transmission media prior to the application of a current pulse to said coil from said coordinate reading means, said current pulse from said coordinate reading means for attaining coordinate readings.

7. A device as claimed in claim 6, wherein said preparatory exciting system is triggered by a signal generated by a reading operation pen of said coordinate reading device, said signal provided for initiating the attaining of coordinate readings.

8. A device as claimed in one of claims 1-3, wherein said effective coordinate reading region of the media comprises a rectangle and wherein said fixed magnetizing coil is provided diagonally across said rectangle, the angle between a conductor of said fixed magnetizing coil and one side of said rectangle selected to be a predetermined value.

9. A device as claimed in claim 4, wherein said effective coordinate reading region of the media comprises a rectangle and wherein said fixed magnetizing coil is provided diagonally across said rectangle, the angle between a conductor of said fixed magnetizing coil and one side of said rectangle selected to be a predetermined value.

10. A device as claimed in claim 5, wherein said effective coordinate reading region of the media comprises a rectangle and wherein said fixed magnetizing coil is provided diagonally across said rectangle, the angle between a conductor of said fixed magnetizing coil and one side of said rectangle selected to be a predetermined value.

* * * * *